United States Patent [19]
McGovern

[11] 3,814,256
[45] June 4, 1974

[54] FILTER CARTRIDGES REMOVAL MEANS
[75] Inventor: Frank J. McGovern, Summit, N.J.
[73] Assignee: Ecodyne Corporation, Chicago, Ill.
[22] Filed: Aug. 24, 1973
[21] Appl. No.: 391,368

[52] U.S. Cl. ................................ 210/323, 210/541
[51] Int. Cl. ............................................ B01j 29/24
[58] Field of Search ............................ 210/323, 541

[56] References Cited
UNITED STATES PATENTS
3,615,016  10/1971  Soriente et al. ................ 210/323 X Primary Examiner—Frank A. Spear, Jr.
Attorney, Agent, or Firm—Joel E. Siegel; Charles M. Kaplan

[57] ABSTRACT

An improved apparatus for removing cylindrical filter cartridges from a tank. The upper ends of the filter cartridges receive spring actuated toggle type means. The toggle means are collapsible upon the exertion of a downward vertical force and spring back to their generally horizontal or extended position upon removal of the vertical force. A lift plate, having openings therethrough, is positioned above the cartridges with an opening in vertical alignment with each cartridge. The diameter of the openings is such as to permit the toggle means to pass therethrough when in their collapsed position and to prevent the toggle means from passing therethrough when in their extended position.

6 Claims, 3 Drawing Figures

PATENTED JUN 4 1974
3,814,256
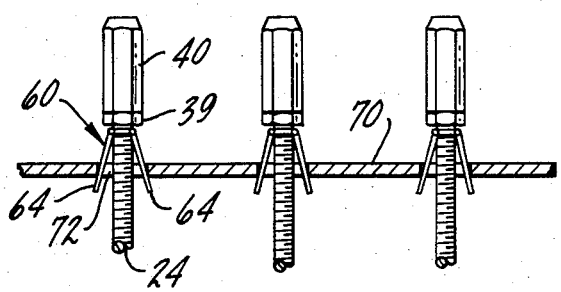
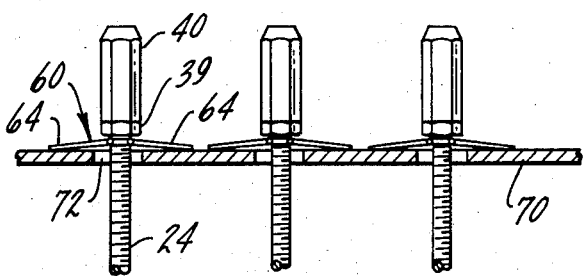
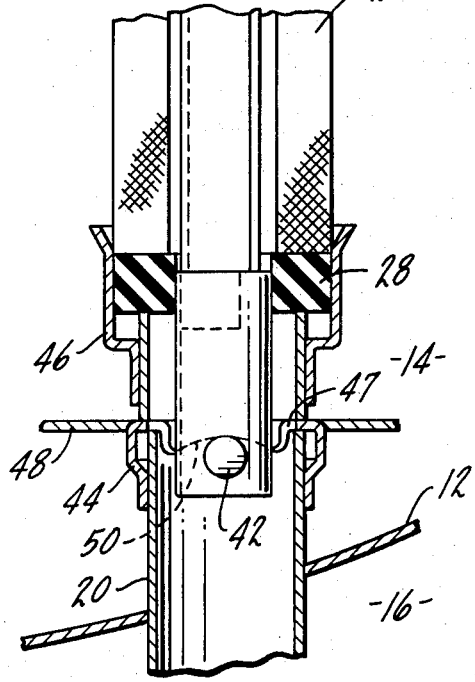

FILTER CARTRIDGES REMOVAL MEANS

BACKGROUND AND SUMMARY OF THE INVENTION

The present invention relates to an improved filter cartridge mounting means which facilitates removal of the cartridges from the filter tank.

Filter tanks having replaceable filter cartridges are well known in the art. An exemplary filter tank with filter cartridges is described in U.S. Pat. No. 3,279,608 to Soriente, et al., issued Oct. 18, 1966, and assigned to the assignee of the present application. When the filter cartridges are removed or installed, personnel must ordinarily reach into the tank in order to handle them. This usually is not hazardous, but when the apparatus is used to filter liquids containing toxic and/or radioactive substances it is dangerous for personnel to enter the tank or to be in close proximity to the filter cartridges. In such instances, the personnel must have means for removing the exhausted cartridges from a position outside the tank. In the case of radioactive substances, removal is preferably carried out from a position that is not dangerously close to the tank, and, where the radiation level is high, removal should be performed from behind a suitable shield.

While apparatus have been developed for the remote removal of cartridges from a filter tank, they are often cumbersome and expensive. In addition, many such apparatus have requird the use of highly specialized tools which are not readily available. An example of such apparatus is described in U.S. Pat. No. 3,664,003 to Wapner, et al., issued May 23, 1972, and assigned to the assignee of the present application. This apparatus includes a lift plate which receives the upper ends of a group of the cartridges after they have been mounted within the tank. The lift plate remains within the tank during operation of the filter and therefore must be made from a costly corrosion resistive metal. When the lift plate is lifted from the tank the cartridges are simultaneously removed therewith. While this apparatus has performed very acceptably in most instances, it has been found that a filter of the precoat type will more evenly distribute the precoat material onto the filter cartridges when lift plates are not present within the tank.

The present invention is directed to an apparatus which permits remote removal of groups of filter cartridges in a manner which does not create these problems.

Accordingly, it is a primary object of the present invention to provide an improved apparatus for unseating and removing filter cartridges from a filter tank.

It is another object to provide an improved apparatus for removing groups of filter cartridges from a filter tank which permits the lift plates to be removed during the operating cycles of the filter.

It is still another object to provide an improved apparatus for removing groups of precoat filter cartridges from a filter tank which does not effect the distribution of precoat material on the cartridges.

Generally, the present invention provides a new and improved apparatus for removing cylindrical filter cartridges from a tank. In accordance with the invention the upper ends of the filter cartridges receive spring actuated toggle type means. The toggle means are collapsible upon the exertion of a downward vertical force and spring back to their generally horizontal or extended position upon removal of the vertical force. A lift plate having openings therethrough is positioned above the cartridges to be removed with an opening in vertical alignment with each cartridge. The diameter of the openings is such as to permit the toggle means to pass therethrough when in their collapsed position and to prevent the toggle means from passing therethrough when in their extended position. When the lift plate is lowered into the tank it contacts the wings of the toggle means and exerts a downward force thereagainst to cause same to move towards their collapsed position and thereby permit the toggle means to pass through the openings. Upon passage of the toggle means through the openings they return to their extended position. The lift plate is then lifted from the tank with the toggle means wings contacting the top surface of the plate which causes the cartridges to be removed therewith. Since the lift plate is only present within the tank during the removal operation of the cartridges it does not interfere with the filter operations and does not have to be made from a costly corrosion resistive metal.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein:

FIG. 1 is a cross-sectional view showing a filter cartridge incorporating the mounting and removal means of the present invention;

FIG. 2 is a cross-sectional view showing the upper portions of a plurality of filter cartridges with the toggle means in their collapsed positions due to the exertion of a downward force by the lift plate; and FIG. 3 is a cross-sectional view showing the filter cartridges as in FIG. 2 with the toggle means in their extended positions ready for removal with the lift plate.

DESCRIPTION OF THE PREFERRED EMBODIMENT

Referring to FIG. 1, a filter cartridge 10 is shown mounted to a tube sheet plate 12. Tube sheet plate 12 typically divides the filter tank (not shown) into an influent zone 14 thereabove and a filtrate zone 16 therebelow. The influent stream passes from the influent zone 14 through the cartridges 10 and into the filtrate zone 16. Such filtering apparatus are well known in the art and a detailed disclosure of such is not deemed necessary for a complete understanding of the present invention. Reference is made to U.S. Pat. No. 3,405,807 to Burkhardt, issued Oct. 15, 1968, and assigned to the assignee of the present invention for a disclosure of a typical filtering apparatus contemplated for use with the present invention.

Tube sheet plate 12 has attached thereto a cartridge seat means 20 for each filter cartridge 10. Each cartridge seat means 20 comprises a small pipe made of steel or the like which extends through a hole in the tube sheet plate 12 and is attached thereto by welding or other suitable means. The seat means 20 is substantially parallel to the longitudinal axis of the filter tank and connects the influent zone 14 with the filtrate zone 16.

In order to fully understand the present invention, it is important to have some understanding of the filter cartridges of the type for which their use is primarily contemplated. Such a filter cartridge 10 is shown installed in seat means 20 in FIG. 1. Filter cartridge 10 has an annular filter portion 22 with a central guide rod 24 mounted therein for sliding movement parallel to the axis of the filter portion 22. The filter portion 22 may be made of stainless steel wrapped with a filtering material, such as nylon or the like, and has an upper seat plate 26 with a central opening therein for the guide rod 24. The lower end of the filter portion 22 has a gasket 28, also having a central opening for the guide rod 24.

At the upper end of the filter cartridge 10, an annular spring seat 30 having a central opening therein for the guide rod 24 is positioned above the seat 26. The seat plate 26 and spring seat 30 are separated by an elastomeric O-ring 32 so that an annular gap 34 is formed between the seat plate 26 and spring seat 30. A spring 36 is positioned around the guide rod 24, and is seated in the spring seat 30. The top of the spring 36 is seated in an annular top cap 37. The top cap 37 has a nut 38 welded thereto at the central opening, so that the top cap 37 may simply be screwed onto the upper threaded end of the guide rod 24. A lock nut 39 and an extension nut 40 are screwed onto the top of the guide rod 24. The lock nut 39 and the extension nut 40 are locked in position spaced from top cap 37.

The bottom of the guide rod 24 has a transverse pin 42 which aids in seating the cartridge 10, and prevents the guide rod 24 from sliding upwardly through the gasket 28. Each cartridge seat means 20 includes a slotted cartridge receiving adapter 44 having a positioning shield 46 mounted thereon. The adapter 44 has a pair of opposed slots 47 which receive the pin 42 on the bottom of the guide rod 24. The slotted adapter 44 also has a pointer 48 projecting outwardly from each side thereof. The adapter 44 has upwardly arcuate portions 50. When the cartridge 10 is positioned in seat means 20, it is lowered so that the pin 42 passes through the slot 47. The guide rod 24 is then turned 90° so that the pin 42 contacts the underside of the arcuate portion 50 which retains the cartridge 10 in position due to the action of spring 36.

In accordance with the present invention a toggle means 60 is received about the threaded portion of guide rod 24 between nuts 38 and 39. Toggle means 60 is of standard construction and includes a threaded central member 62 and a pair of wing members 64. Central member 62 is threadedly received about rod 24 immediately below nut 39. Wing members 64 are pivotally mounted to central member 62 so as to only permit movement between an extended position wherein the wing members 64 extend substantially horizontally outward from member 62, as seen in FIG. 3 and a collapsed position wherein the wing members 64 extend substantially vertically downward from member 62, as seen in FIG. 2. Wing members 64 are biased towards their extended position by spring means (not shown) associated with their pivotal connection to member 62.

A lift plate 70 is provided for lifting a plurality of filter cartridges 10 from the tank for inspection and/or replacement or repair. Lift plate 70 includes openings 72 formed therein spaced apart to permit vertical alignment thereof with a corresponding cartridge 10 shown positioned immediately thereabove. Openings 72 are sized to permit the passage of the corresponding toggle means 60 therethrough, when in their collapsed positioned, and to prevent the passage therethrough when in their extended position. The significance of this dimensional relationship will become apparent from a discussion of the operation of the present invention hereinbelow. Lift plate 70 may be fabricated from carbon steel or other similar inexpensive metals, since the plate 70 is not in contact with the liquid being treated and corrosion thereof is not a particular problem.

After the cartridges 10 have been in operation for a period of time, it becomes necessary to remove and replace them. In carrying out the removal process in accordance with the present invention, the tank is drained of all liquid and the top cover is removed to permit access to the cartridges 10. The extension nuts 40 are rotated 90° with a suitable wrench, thus unseating the cartridges 10 from the seat means 20. The lift plate 70 is then lowered into the tank such that the nuts 40 pass through the corresponding opening 72 in plate 70. As the plate 70 is lowered into the tank it contacts the upper surfaces of the wings members 64 and exerts a downward force thereagainst to cause the same to move towards their collapsed position against the spring bias, as seen in FIG. 2. Further lowering of the plate 70 causes the toggle means 60 to pass through the corresponding openings 72 and then return to their extended positions due to the action of the spring bias, as seen in FIG. 3. Lift plate 70 is then lifted from the tank with the wing members 64 in contact with the top surface of the plate 70 which causes the cartridges 10 to be lifted and removed therewith. To facilitate movement of the plate 70 and permit remote removal thereof a plurality of lifting eyes (not shown) may be provided.

The above described apparatus and method of operating same facilitates the removal of filter cartridges from a filter tank. The present invention is particularly applicable for use in filtering apparatus which includes precoat type filter cartridges. Since the lift plate 70 is only positioned within the tank after the system is shut down for removal of the cartridges, it does not interfere with the application of an even distribution of precoat material to the cartridges. Further, since the lift plate 70 is not present within the tank when it is full of the liquid being treated, the plate does not have to be fabricated from a costly corrision resistive material.

As will be appreciated by those skilled in the art, the apparatus and method of the present invention may be used in conjunction with filter cartridges and/or seating means having a design that differs from the design shown in the drawings. Exemplary filter cartridges and seating means having a different design are shown and described in U.S. Pat. Nos. 3,279,608 and 3,405,807, which are assigned to the assignee of this application. Some of the filter cartridges and seating means shown in these patents require tilting of the cartridges, rather than rotation, to accomplish the seating and unseating operations.

Obviously, many modifications and variations of the invention as hereinbefore set forth will occur to those skilled in the art, and it is intended to cover in the appended claims all such modifications and variations as fall within the true spririt and scope of the invention.

What is claimed:

1. Improved apparatus for removing filter cartridges from a filter tank, comprising: toggle means received by the upper ends of said filter cartridges, said toggle means being movable between a collapsed position upon the application of a downward force thereon and an extended position upon removal of said downward force; and lift plate means having openings formed therethrough in vertical alignment with said toggle means, said openings being dimensioned to cause a downward force on said toggle means upon lowering said lift plate means into said tank which moves said toggle means to their collapsed positions permitting said toggle means to pass through said openings and then return to their extended positions so as to cause removal of said filter cartridges from said tank upon removing said lift plate means from said tank.

2. The invention as defined in claim 1 wherein said lift plate means is positoned in said tank only during the removal operation of said filter cartridges.

3. The invention as defined in claim 2 wherein said toggle means is spring actuated to cause movement from said collapsed position to said extended position upon removal of said downward force.

4. The invention as defined in claim 3 wherein said openings in said plate means are dimensioned to permit said toggle means to pass therethrough when in their collapsed position and prevent said toggle means from passing therethrough when in their extended position.

5. The invention as defined in claim 1 wherein said toggle means includes wing members which are movable between a substantially horizontal position when said toggle means is in its extended position and a substantially vertical position when said toggle means is in its collapsed position.

6. In a filter tank having a tube sheet plate dividing the tank into an influent zone and a filtrate zone, cartridge seat means supported by said tube sheet, and a plurality of replaceable filter cartridges having upper and lower ends, means mounting the lower ends of said cartridges to said seat means; an improved apparatus for removing said filter cartridges from said tank, comprising: toggle means received by the upper ends of said filter cartridges, said toggle means being movable between a collapsed position upon the application of a downward force thereon and extended position upon removal of said downward force; and lift plate means having openings formed therethrough in vertical alignment with said toggle means, said openings being dimensioned to cause a downward force on said toggle means upon lowering said lift plate means into said tank which moves said toggle means to their collapsed positions permitting said toggle means to pass through said openings and then return to their extended positions so as to cause removal of said filter cartridges from said tank upon removing said lift plate means from said tank.

* * * * *